US012134274B2

(12) United States Patent
Chen et al.

(10) Patent No.: US 12,134,274 B2
(45) Date of Patent: Nov. 5, 2024

(54) MOLDED STRUCTURES WITH CHANNELS

(71) Applicant: Hewlett-Packard Development Company, L.P., Spring, TX (US)

(72) Inventors: Chien-Hua Chen, Corvallis, OR (US); Michael W. Cumbie, Corvallis, OR (US); Michael G. Groh, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/454,771

(22) Filed: Aug. 23, 2023

(65) Prior Publication Data

US 2023/0391086 A1 Dec. 7, 2023

Related U.S. Application Data

(63) Continuation of application No. 17/312,360, filed as application No. PCT/US2019/039074 on Jun. 25, 2019, now Pat. No. 11,780,227.

(51) Int. Cl.
*B41J 2/16* (2006.01)
*B41J 2/14* (2006.01)
*B41J 2/18* (2006.01)

(52) U.S. Cl.
CPC ......... *B41J 2/1639* (2013.01); *B41J 2/14016* (2013.01); *B41J 2/14201* (2013.01);
(Continued)

(58) Field of Classification Search
CPC .. B41J 2/1639; B41J 2/14016; B41J 2/14201; B41J 2/1601; B41J 2/1607; B41J 2/1625;
(Continued)

(56) References Cited

U.S. PATENT DOCUMENTS 4,032,929 A 6/1977 Fischbeck et al.
5,106,468 A 4/1992 Chimenti
(Continued)

FOREIGN PATENT DOCUMENTS

CN 1337580 A 2/2002
CN 1346053 A 4/2002
(Continued)

OTHER PUBLICATIONS

Engineering Tool Box, "Resistivity and Conductivity—Temperature Coefficients for Common Materials", available at: <https://www.engineeringtoolbox.com/resistivity-conductivity-d_418.html>[Accessed Sep. 11, 2021] (Year: 2003), 8 pages.
(Continued)

*Primary Examiner* — Lisa Solomon
(74) *Attorney, Agent, or Firm* — Foley & Lardner LLP

(57) ABSTRACT

An example device may comprise a molded structure and a dependent device coupled to the molded structure. The molded structure comprises thermo-electric traces and channels. The channels are between ten μm and two hundred μm, or less in one dimension. The dependent device comprises apertures corresponding to the channels and through which fluids, electromagnetic radiation, or a combination thereof is to travel. The dependent device also comprises contacts corresponding to the thermo-electric traces of the molded structure.

16 Claims, 4 Drawing Sheets

(52) U.S. Cl.
CPC ........... *B41J 2/1601* (2013.01); *B41J 2/1607* (2013.01); *B41J 2/1625* (2013.01); *B41J 2/18* (2013.01)

(58) Field of Classification Search
CPC . B41J 2/18; B41J 2/1631; B41J 2/1637; B41J 2002/14491; B41J 2202/12; B41J 2202/20; B41J 2/1626; B41J 2/1632; B41J 2/1643; B41J 2/14072
See application file for complete search history.

(56) References Cited

U.S. PATENT DOCUMENTS

| | | | |
|---|---|---|---|
| 5,218,754 | A | 6/1993 | Rangappan |
| 6,991,906 | B1 | 1/2006 | Fuhr et al. |
| 7,338,580 | B2 | 3/2008 | Conta et al. |
| 7,384,791 | B2 | 6/2008 | Tyvoll et al. |
| 7,390,387 | B2 | 6/2008 | Childers et al. |
| 7,438,392 | B2 | 10/2008 | Vaideeswaran et al. |
| 7,713,395 | B1 | 5/2010 | James et al. |
| 8,109,614 | B2 | 2/2012 | Giovanola et al. |
| 8,695,640 | B2 | 4/2014 | Unger et al. |
| 9,535,000 | B2 | 1/2017 | Guo et al. |
| 9,555,421 | B2 | 1/2017 | Sato et al. |
| 9,592,501 | B2 | 3/2017 | Jarvius et al. |
| 10,078,066 | B2 | 9/2018 | Davalos et al. |
| 10,343,165 | B2 | 7/2019 | Sadri et al. |
| 2005/0158704 | A1 | 7/2005 | Tyvoll et al. |
| 2006/0001039 | A1 | 1/2006 | Zamanian |
| 2006/0177815 | A1 | 8/2006 | Soh et al. |
| 2007/0125941 | A1 | 6/2007 | Lee et al. |
| 2007/0153061 | A1 | 7/2007 | Silverbrook et al. |
| 2009/0139866 | A1 | 6/2009 | Nam et al. |
| 2012/0298511 | A1 | 11/2012 | Yamamoto |
| 2013/0029407 | A1 | 1/2013 | Terazono et al. |
| 2014/0262970 | A1 | 9/2014 | Sato et al. |
| 2014/0346044 | A1 | 11/2014 | Chi et al. |
| 2015/0124019 | A1* | 5/2015 | Cruz-Uribe ............ B41J 29/393 347/18 |
| 2015/0306599 | A1 | 10/2015 | Khandros et al. |
| 2016/0001551 | A1 | 1/2016 | Chen et al. |
| 2016/0009082 | A1 | 1/2016 | Chen et al. |
| 2016/0299138 | A1 | 10/2016 | Almasri et al. |
| 2017/0276679 | A1 | 9/2017 | Chapman et al. |
| 2018/0106805 | A1 | 4/2018 | Allen et al. |
| 2018/0134039 | A1 | 5/2018 | Chen et al. |
| 2018/0272711 | A1 | 9/2018 | Nakayama et al. |
| 2018/0333956 | A1 | 11/2018 | Chen et al. |
| 2019/0248141 | A1 | 8/2019 | Chen et al. |
| 2022/0111645 | A1 | 4/2022 | Clark et al. |

FOREIGN PATENT DOCUMENTS

| | | | |
|---|---|---|---|
| CN | 1608850 | A | 4/2005 |
| CN | 101277724 | A | 10/2008 |
| CN | 100577266 | C | 1/2010 |
| CN | 101762440 | A | 6/2010 |
| CN | 102703373 | A | 10/2012 |
| CN | 102725060 | A | 10/2012 |
| CN | 103194370 | A | 7/2013 |
| CN | 103194371 | A | 7/2013 |
| CN | 103196725 | A | 7/2013 |
| CN | 103620398 | A | 3/2014 |
| CN | 103733021 | A | 4/2014 |
| CN | 203648695 | U | 6/2014 |
| CN | 104379263 | A | 2/2015 |
| CN | 105121166 | A | 12/2015 |
| CN | 105121171 | A | 12/2015 |
| CN | 105142912 | A | 12/2015 |
| CN | 105189122 | A | 12/2015 |
| CN | 105312155 | A | 2/2016 |
| CN | 105555412 | A | 5/2016 |
| CN | 105793044 | A | 7/2016 |
| CN | 107901609 | A | 4/2018 |
| CN | 107949481 | A | 4/2018 |
| CN | 108058485 | A | 5/2018 |
| CN | 109641462 | A | 4/2019 |
| EP | 2961612 | A1 | 1/2016 |
| EP | 2715450 | B1 | 7/2018 |
| JP | 60-121742 | A | 6/1985 |
| JP | 2000-093839 | A | 4/2000 |
| JP | 2002-321374 | A | 11/2002 |
| JP | 2004-113223 | A | 4/2004 |
| JP | 4932066 | B2 | 5/2012 |
| JP | 2014-178119 | A | 9/2014 |
| JP | 5807004 | B2 | 11/2015 |
| JP | 2018-108707 | A | 7/2018 |
| JP | 2018-158480 | A | 10/2018 |
| JP | 2019-507020 | A | 3/2019 |
| TW | 201509694 | A | 3/2015 |
| TW | 201532848 | A | 9/2015 |
| WO | 2011/036433 | A1 | 3/2011 |
| WO | 2011/067961 | A1 | 6/2011 |
| WO | 2011/105507 | A1 | 9/2011 |
| WO | 2014/133561 | A1 | 9/2014 |
| WO | 2015/080730 | A1 | 6/2015 |
| WO | 2016/025518 | A1 | 2/2016 |
| WO | 2017/078716 | A1 | 5/2017 |
| WO | 2018/199874 | A1 | 11/2018 |
| WO | 2018/208276 | A1 | 11/2018 |
| WO | 2019/027430 | A1 | 2/2019 |
| WO | 2019/027432 | A1 | 2/2019 |
| WO | 2019/094022 | A1 | 5/2019 |

OTHER PUBLICATIONS

IP.com search (Year: 2021).

Jeon et al., "Continuous Particle Separation Using Pressure-driven Flow-induced Miniaturizing Free-flow Electrophoresis", Scientific Reports 6, Article No. 19911, Retrieved from Internet—http://www.nature.com/articles/srep19911, 2016, 26 Pages.

Jia et al., "Continuous Dielectrophoretic Particle Separation Using a Microfluidic Device With 3D Electrodes and Vaulted Obstacles", Electrophoresis, vol. 36, Retrieved from Internet—https://onlinelibrary.wiley.com/doi/abs/10.1002/elps.201400565, 2015, pp. 1744-1753.

Lewpiriyawong et al., "Dielectrophoresis Field-Flow Fractionation for Continuous-Flow Separation of Particles and Cells in Microfluidic Devices", Advances in Transport Phenomena, Retrieved from Internet—https://link.springer.com/chapter/10.1007%2F978-3-319-01793-8_2, 2013, pp. 29-62.

Wang et al., "Dielectrophoresis switching with vertical sidewall electrodes for microfluidic flow cytometry", Lab on a Chip, Royal Society of Chemistry, vol. 7, Jun. 25, 2007, pp. 1114-1120.

Yue et al., "The Development of Dieletrophoresis and Effects of the Physical Parameter on Dieletrophoresis", Environmental Science & Technology, vol. 32, No. 6C, Jun. 30, 2009, pp. 176-180.

* cited by examiner

MOLDED STRUCTURES WITH CHANNELS

CROSS-REFERENCE TO RELATED PATENT APPLICATIONS

This application is a Continuation Patent Application that claims priority under 35 U.S.C. § 120 to U.S. patent application Ser. No. 17/312,360, filed Jun. 9, 2021, which is a U.S. National Stage Entry under 35 U.S.C. § 371 of International Application No. PCT/US2019/039074, filed Jun. 25, 2019, the contents of all such applications being hereby incorporated by reference in their entirety and for all purposes as if completely and fully set forth herein.

BACKGROUND

At times, devices, such as semiconductor devices, may be attached to molded structures. The molded structure may have through holes or channels through which fluids and gasses (among other things) may travel. A number of processes exist for creating molded structures with through holes or channels. For instance, build up processes, such as lithography on dry film, may be used to create molded structures with through holes or channels. Substrate bonding and/or welding may also be used to yield molded structures with through holes or channels.

BRIEF DESCRIPTION OF THE DRAWINGS

Various examples will be described below by referring to the following figures.

Figure 1:
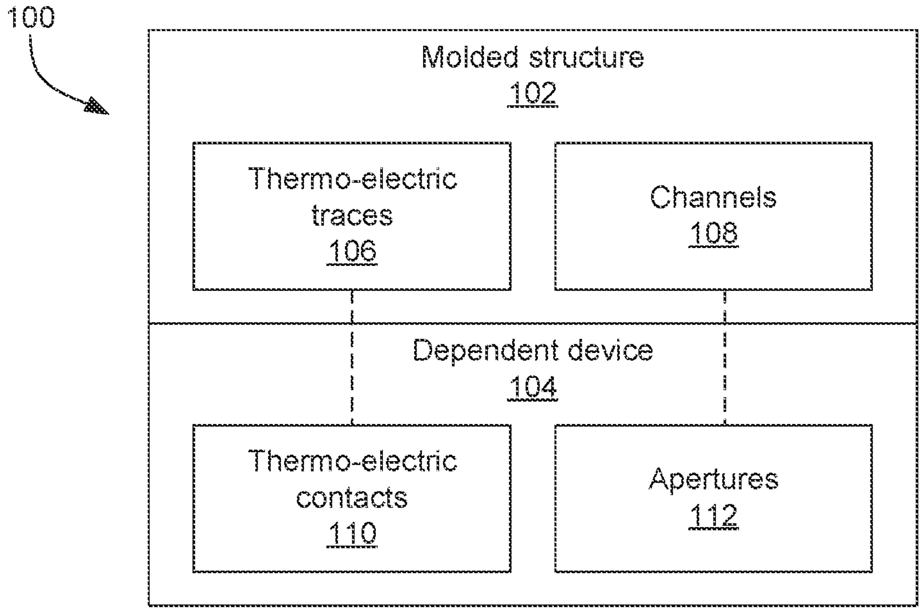
FIG. 1 is an illustration of an example device comprising a molded structure with channels.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration.

DETAILED DESCRIPTION

Devices, such as electronic devices, electromechanical devices, fluidic devices, optical devices, and the like, may use components that enable desired functionality. The enabling components may provide channels to enable fluids (among other things) to flow to fluidic ejection dies of the electronic devices. In some cases, these enabling components may be made up of molding compounds and structures.

In addition to receiving fluids from supporting components, the electronic devices may receive electric signals from other components of the electronic devices. For example, electric signals, such as in the form of current pulses, for controlling operation of the electronic devices may be transmitted and/or received via wires or traces that enable an electrical connection between the electronic devices and a controller.

Further, in some implementations, thermal energy, such as in the form of heat, may be directed away from the fluidic ejection dies via thermally-conductive components and/or fluids. In addition (or alternative) to transmitting electrical signals via the traces, the traces may be thermally conductive and may thus be used to conduct heat away from a point at which it is generated. Thus, traces capable of conducting electricity or thermal energy are referred to herein as thermo-electric or thermo-electrically conductive traces, for simplicity, as the components that enable propagation of both electric signals and thermal energy may have similar characteristics, such as being metals or metalloids.

In some cases, in addition to embedded thermo-electric traces, the molded supporting components may include channels, slots, and/or through holes. Channels refer to voids within a molded component through which fluids, gasses, electromagnetic radiation (EMR) (e.g., visible light), and the like may propagate. Through holes refer to channels that have independent openings at one (or more) surfaces of a molded supporting structure, and through which fluids may flow. Slots refer channels through that have an opening at one surface of the molded supporting structure, but not necessarily two. For instance, a slot may lead to a fluid channel, which may lead to another slot and/or a through hole. For simplicity, the present disclosure uses the term "channel" in a general sense, which may also refer to a through hole or a slot, according to context.

To illustrate how one such example molded device with channels may be used in conjunction with a dependent device, the example of an inkjet printing device (e.g., for dispensing printing fluids, such as colorants or agents, by way of example) is discussed without limitation. To be clear, while the concepts of molded devices with channels may apply to an inkjet printing device, it should be appreciated that they may be relevant to other contexts, such as to microfluidic devices for biomedical applications, optical propagation devices such as for sensing or transmitting EMR, and gas sensing devices, by way of example.

Thus, for an example inkjet printing device, a fluid ejection device (e.g., a printhead) may be used to dispense printing fluids (e.g., inks, colorants, agents) on a substrate. The fluid ejection device may include a fluidic die (e.g., a dependent device) having an array of fluid ejection nozzles through which droplets of printing fluid are ejected towards a substrate. The fluidic die may be attached to a molded device (e.g., a chiclet) with channels, through which the printing fluid may flow, such as towards and/or away from the fluidic die. As such, the molded device may operate in conjunction with the fluidic die to enable ejection of printing fluids, such as by delivering fluids to the fluidic die, recirculating fluids (e.g., to reduce pigment buildup), providing thermal protection to the fluidic die (e.g., pulling heat away from the fluidic die, such as in cases in which the fluidic die ejects fluids in response to current pulses through resistive elements to generate heat), by way of example.

Looking at another illustrative example, in the space of microfluidics used for biomedical applications, a microfluidic die (e.g., a dependent device) may be attached to a supporting component made up of a molding compound and having channels. In this case, the channels may be used to direct fluids and solids (e.g., blood, plasma, etc.) towards desired portions of the microfluidic die.

In these and other cases, there may be a desire to reduce device size. For example, smaller biomedical devices may be desirable, such as to enable inclusion of multiple testing apparatuses on a small die. Smaller devices may also enable biomedical testing using smaller fluidic volumes. And smaller devices may also reduce overall cost, such as by enabling a greater number of dies to be produced from a wafer. Of course, there may be a number of other reasons to seek to decrease a size of a fluidic device.

One aspect of the push to reduce fluidic device size may be reducing channel size within molded components. For instance, while it may be possible to use semiconductor fabrication processes to achieve node sizes on the order of 20 nm (and less), achieving corresponding sizes for channels within molded compounds may present complexity and challenges using traditional build-up fabrication and/or machining processes. In fact, even at the range of tens or hundreds of μm, forming channels in molded components may be challenging and/or expensive. For example, it may not be currently possible to machine channels within a molded component on the order of five μm to five hundred μm.

And returning to the example of an inkjet ejection device, there may be a desire to increase a fluid ejection nozzle density. But it may be that fluidic channel sizes within a molded component connected to a fluidic die may limit possible nozzle densities. There may be a desire, for instance, to have fluidic channels within a molded component on the order of five μm to five hundred μm, by way of example.

With the foregoing in mind, the present description proposes as process capable of yielding devices and components having channels on the order of tens to hundreds of μm.

In one implementation, for example, such channel sizes may be achieved by using a sacrificial material on or over which a molding material is deposited. The sacrificial material may then be removed (e.g., etched away) to leave channels of the desired dimensions within the molded structure. Thus, for example, channels on the order of tens to hundreds of μm may be formed within a molded component. In some cases, it may be possible to achieve channels of less than ten μm using a sacrificial material.

In some cases, this approach for creating channels within a molded component may also allow creation of other structures within the molded component. For instance, embedded traces of sacrificial material may be used in addition to thermo-electric traces and both may be encapsulated within a molding compound. The sacrificial material may be removed (e.g., etched away) while leaving the thermo-electric traces (e.g., by protecting the thermo-electric traces using a layer of photoresist while removing the sacrificial material). Thus, the resulting molded device may be suitable for propagation of fluidics (through the channels) and thermal energy and/or electrical signals (through the thermo-electric traces; in some cases, the thermal energy may propagate through channels, as well).

As shall be apparent, such an approach may be desirable for yielding molding components with channels having desired dimensions.

FIG. 1 illustrates an example device 100 that may include a molded structure 102 with channels of between ten μm and two hundred μm, by way of example. The process for yielding channels of such dimensions will be discussed further hereinafter, and it will be apparent that molded devices of other dimensions (e.g., less than ten μm, greater than two hundred μm, etc.) are contemplated by the present description and claimed subject matter (unless explicitly disclaimed).

FIG. 1 also illustrates an example dependent device 104, attached to molded structure 102. As used herein, the term "dependent device" refers to a device or component that depends on a molded device or component to enable functionality. For instance, in the context of a fluidic die for ejecting printing fluid on a substrate (e.g., for an inkjet printing device), the fluidic die corresponds to the "dependent device," and the molded device corresponds to the molded chiclet to which the fluidic die is attached. In this example, the molded chiclet enables ejection of printing fluid by carrying printing fluids to and/or from the fluidic die via channels 108 and apertures 112. For example, apertures may correspond to fluid feed holes, which carry fluids towards and/or away from ejection chambers of the fluidic die. Further, the molded chiclet may also, in some cases, carry thermo-electric signals (e.g., via thermo-electric traces 106 and thermo-electric contacts 110), such as to enable activation of ejection devices (e.g., resistors in the case of a thermal inkjet device, or piezo-membranes in the case of a piezoelectric inkjet device, etc.) and/or to carry thermal energy away from the ejection chambers of the fluidic die. By way of illustration of using channels 108 to dissipate thermal energy, fluids may flow through channels 108, the fluids may pull thermal energy away from one portion of fluidic die to a second portion of fluidic die.

In the context of a biomedical microfluidic device, a microfluidic die corresponds to the dependent device (e.g., dependent device 104), and molded structure 102 corresponds to the molded support component through which fluids may flow to and/or from the microfluidic die. Similar to the case of the fluidic die for ejection of printing fluids, the molded device in this example may enable operation of the biomedical microfluidic die due in part to the channels (e.g., channels 108) within the molded device. It will be appreciated that such dependent devices may be used in a number of other cases, such as molded devices supporting chips with light emitting diodes (LEDs) and through which electrical signals and/or EMR may propagate; molded devices supporting sensor devices through which electrical signals, gasses and/or liquids may propagate for sensing by the sensor devices, etc.

Molded structure 102 may be composed of materials having a low coefficient of thermal expansion (low CTE). Example materials include (but are not limited to) epoxy molding compounds (EMC) and thermoplastic materials (e.g., polyphenylene sulfide (PPS), polyethylene (PE), polyethylene terephthalate (PET), polysulfones (PSU), liquid-crystal polymer (LCP), etc.). In one implementation, molded structure 102 may comprise a material (such as one of the foregoing) having a low CTE, such as in the range of 20 ppm/C or less. For instance, in one case, a material (such as one of the foregoing) may be selected having a low CTE, such as a CTE of 12 ppm/C or less.

As shall be discussed in further detail hereinafter, the material of molded structure 102 may be applied on or over a structure having sacrificial materials and/or thermo-electric traces. For example, sacrificial materials may be in the form of traces of a desired material (e.g., copper (Cu), nickel (Ni), etc.). In one case, for example, sacrificial structures may be applied to a support structure. In another case, a lead frame structure having portions with sacrificial materials may be used. A molding compound may then be applied on or over the structure.

Molded structure 102 may be unitary in form. As used herein, a unitary structure refers to a component that cannot be broken into parts without breaking an adhesive bond, cutting a material, or otherwise destroying that component. For example, an EMC may be used to form a unitary molded structure 102 having thermo-electric traces 106 and channels 108 formed therein as part of a molding process.

Returning to FIG. 1, example molded structure 102 may be connected to example dependent device 104 as illustrated. For instance, molded structure 102 may include thermo-electric traces 106 in communication with contacts 110 (e.g., thermo-electric contacts) of dependent device 104 (as illustrated by a broken line). Similarly, channels 108 may be in communication with apertures 112 of dependent device (as illustrated by a broken line).

As noted, in one implementation, both thermo-electric traces 106 and channels 108 may be embedded within molded structure 102. However, in other cases, channels 108 may be embedded within molded structure 102 while thermo-electric contacts 110 may be in communication with thermo-electric traces external to molded structure 102 (not shown).

Furthermore, as noted above, in some implementations, thermo-electric traces 106 may correspond to electrically and/or thermally conductive traces that may be used for purposes other than carrying signals to thermo-electric contacts 110. For example, traces 106 may be capable of dissipating thermal energy away from dependent device 104. Example device 100 may also be used for thermal control and dissipation, as noted above. For instance, dependent device 104 may correspond to a semiconductor device that may generate thermal energy (e.g., heat) through normal operation (e.g., as electrical current travels through traces and components of the semiconductor device). Dependent device 104 may have microfluidic channels within its structure through which fluid may flow in order to remove thermal energy from the device. The thermal energy dissipating fluid may enter and leave dependent device 104 via apertures 112. For example, cooling fluid may travel through channels 108 and enter apertures 112. The cooling fluid may extract thermal energy from dependent device 104 and may carry the extracted thermal energy through apertures 112 and channels 108.

In any case, because channels 108 may be formed within molded structure 102 using a sacrificial material that is subsequently removed, channels 108 may be between ten μm and two hundred μm, or less, in one dimension.

With the foregoing in mind, whether molded structure 102 is used in conjunction with a fluidic die for ejecting printing fluid or something else, as noted above, there may be a desire to have channels having a dimension of between ten μm and two hundred μm, or less. Such channel dimensions may be beneficial, such as by allowing apertures 112 of dependent device 104 to be more densely arranged within dependent device 104, such as than might otherwise be the case.

Thus, an example device (e.g., device 100) may comprise a molded structure (e.g., molded structure 102) connected to a dependent device (e.g., dependent device 104). The molded structure may comprise thermo-electric traces (e.g., thermo-electric traces 106) and channels (e.g., channels 108). The channels are to be between ten μm and two hundred μm, or less in one dimension. The dependent device may comprise apertures (e.g., apertures 112) corresponding to the channels and through which fluids, electromagnetic radiation, or a combination thereof is to travel. The dependent device may also comprise contacts (e.g., thermo-electric contacts 110) corresponding to the thermo-electric traces of the molded structure. As noted above, the dependent device may include a fluid ejection die, such as to eject printing fluid via ejection nozzles.

Figure 2:
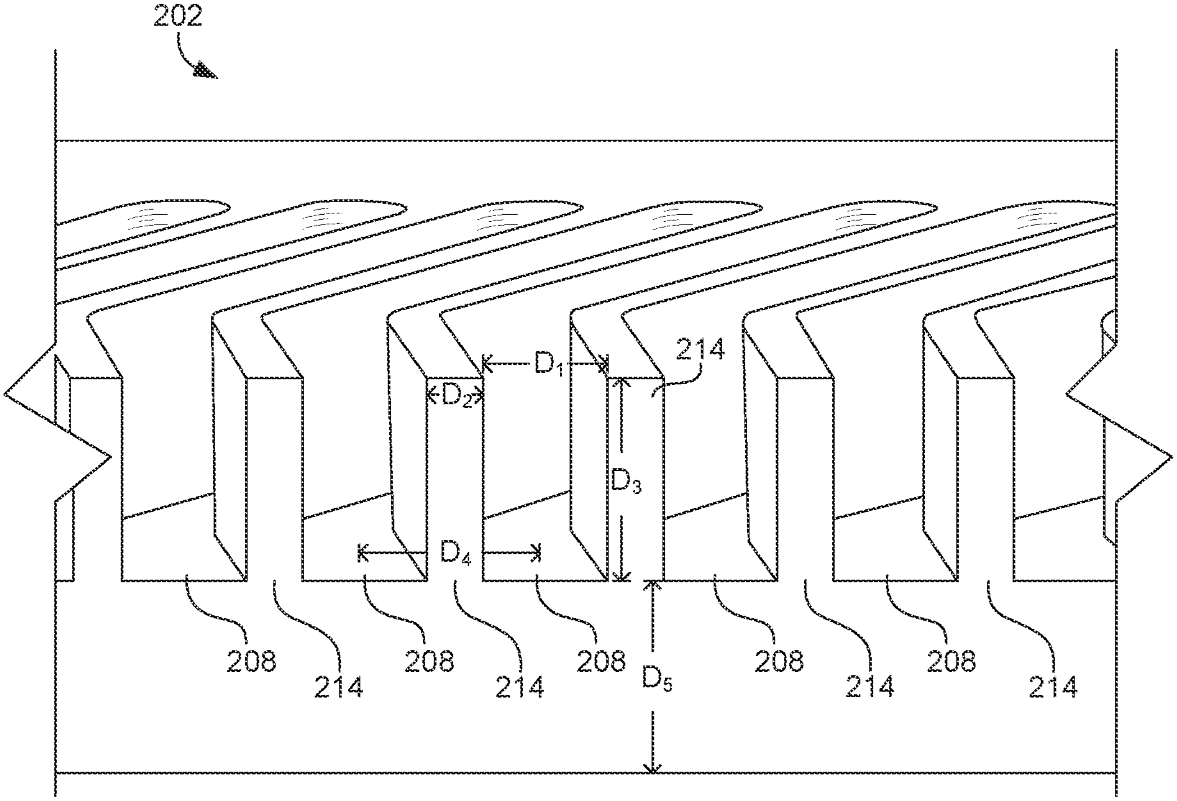
FIG. 2 is an illustration of an example molded structure with channels.

Turning to FIG. 2, which is a cross section of a portion of an example molded structure 202, different aspects of channels (e.g., channels 208) are illustrated. At this point, it is noted that element numbering has been adopted in order to indicate similar elements and/or components (e.g., X00: 100, 200, 300, etc. may be similar in structure and/or operation; X02: 102, 202, 302, etc. may be similar in structure and/or operation, etc.). For example, molded structure 202 in FIG. 2 may be similar to molded structure 102 in FIG. 1. Of course, in some cases, while structure and/or operation of similar elements and/or components may be similar, there may nevertheless be differences. As such, indications of similar elements and/or components are not intended to be done in a limiting sense (e.g., limiting structure and/or components in subsequent figures to the structure and/or components of preceding elements, and vice versa) unless explicitly stated. For example, the structure (e.g., particular arrangement, shape, materials, etc.) of channels 208 as discussed in relation to FIG. 2 is not intended to limit the structure of channels illustrated in other figures. Similarly, the operation of channels 208 as discussed in relation to FIG. 2 is also not intended to limit the structure of channels illustrated in other figures. For instance, while the dimensions of channels 208 in FIG. 2 may apply to an implementation of a device illustrated in another figure (e.g., FIG. 3), the similar elements in other figures may also support other implementations in which the dimensions may be different.

FIG. 2 illustrates a number of channels 208. As shown, in one implementation, channels 208 may be arranged in a chevron-like arrangement within molded structure 202. Channels 208 may be separated by a number of separation structures 214. Channels 208 may be arranged within molded structure 202 to correspond to (e.g., be in fluid communication with) apertures of a dependent device (e.g., apertures 112 of dependent device 104).

FIG. 2 illustrates a number of example channel dimensions, $D_1$-$D_5$. It is noted that FIG. 2 illustrates a particular form of channels, but other implementations, such as in which channels 208 are cylindrical, are also contemplated. Those of skill in the art will appreciate that rather than describing the width, length, and/or depth of a side, in an implementation in which channels 208 are cylinders, the width and length may instead represent a diameter, etc. Returning to FIG. 2, a width of channels 208 is illustrated as $D_1$. In one example, $D_1$ may correspond to approximately five to ten μm. As noted above, traditional fabrication and machining techniques may be unable to achieve channel widths of such small sizes. In another example, $D_1$ may be approximately fifteen to twenty μm in width. Of course, such techniques enable fabrication of wider channels, such as on the order of one hundred, two hundred, three hundred, four hundred, five hundred, or more μm. Thus, in some cases, such as in some claims, a range of ten to two hundred μm in one dimension may be used as a channel dimension of interest for some contexts. For instance, in the context of a fluid ejection device (e.g., a printing device), the range of ten to two hundred μm in width may be of interest. Of course, in other contexts, the ranges may be smaller or larger. For example, in the context of a biomedical device for testing red blood cells, which can have diameters of six to eight μm, there may be a desire for channel dimensions on the order of ten to twenty μm. Furthermore, there may be implementations for which channels (e.g., channels 208) may be of varying dimensions. Again, in the context of biomedical diagnostic devices, a first subset of channels may have a first width, corresponding to a first fluid or test, and a second subset of channels may have a second width, corresponding to a second fluid or test, etc.

In some cases, there may be a correspondence between the width of channels 208 (e.g., $D_1$) and a height of channels 208 (e.g., $D_3$). For example, in one case, $D_1$ may be approximately 20 μm and $D_3$ may be approximately 100 μm. In another case, $D_1$ may be approximately 30 μm and $D_3$ may be approximately 200 μm. Etc. The different correspondences between dimensions may be based on materials selected (e.g., some materials may call for additional thickness for structural soundness), use cases (e.g., as noted above with the example of red blood cells, some dimensions may be dictated by context in which a device is to be used), fabrication constraints (e.g., as a width of sacrificial materials decreases, it may be more challenging to maintain a sacrificial material height, etc.), etc.

Another dimension of channels may be a width of separation structures 214, represented as $D_2$. Similar to the dimensions, $D_1$ and $D_3$, the width of separation structures 214 may depend on the context in which molded structure 202 is to be used, the materials used to form molded structure 202, etc. In one example, $D_2$ may comprise between 50 μm and 100 μm. For instance, in the context of a fluid ejection device, there may be a desire to provide a denser arrangement of fluid ejection nozzles. Thus, achieving a width $D_2$ of approximately 90 μm, may be of interest in one case. In other examples, different dimensions for $D_2$ may be of interest, such as greater or smaller than 90 μm. For example, a different molded structure 202 may have $D_2$ of approximately 30 μm.

Next, $D_4$ represents a channel-to-channel dimension and may be between one hundred μm and five hundred μm in one implementation. Of course, $D_4$ will depend on dimensions $D_1$ and $D_2$. Indeed, in some cases, $D_4$ will be the sum of $D_1$ and $D_2$. Therefore, in an implementation in which $D_1$ is approximately 20 μm and $D_2$ is approximately 90 μm, $D_4$ will be approximately 110 μm.

In the context of an example fluid ejection device, $D_4$ may correspond to a nozzle-to-nozzle spacing, which will be discussed in greater detail hereinafter. Of course, there may be differences between $D_4$ and nozzle-to-nozzle spacing based, for instance, on nozzle placement with relation to a firing chamber, a particular nozzle architecture (e.g., in some cases, nozzles may be offset with respect to neighboring nozzles), etc. For example, as shall be described in relation to FIG. 3, which describes a fluidic die with a recirculation path, a nozzle may not be in fluid communication with each channel 208. For instance, a first channel 208 may correspond to a fluid path for transmitting fluid towards a dependent device and a neighboring channel 208 may correspond to a fluid path for transmitting fluid away from the dependent device.

$D_5$ is yet another dimension of example molded structure 202. Again, dimensions for $D_5$ may depend on the intended use for molded structure 202 and materials making up molded structure 202. In some uses, for instance, there may be a desire for that $D_5$ be thicker than $D_3$ in order to provide structural support to molded structure 202. However, in other cases, molded structure 202 may be mounted on other components which may provide structural support, and as such, the $D_5$ can be thinner than $D_3$. For example, in the case of a fluid ejection device in which $D_3$ is approximately 100 μm, $D_5$ may be approximately 50 μm.

As should be apparent, the different dimensions of different portions of molded structure 202 may vary according to different needs. However, as already discussed, the process of achieving small dimensions-particularly, $D_1$, $D_2$, and $D_4$-within a molded structure may present challenges and complexities that traditional fabrication and machining approaches may not be able to overcome. Consequently, the approaches and methods described herein-such as using sacrificial traces to be removed from molded structures—may be of interest in a variety of different contexts. In the next drawing, FIG. 3, a particular example context of fluid ejection devices, will be discussed in order to illustrate how claimed subject matter may be of interest to overcoming the challenges and complexities encountered as fluid ejection devices decrease in size and/or density of fluid ejection nozzles increases. Of course, it is to be understood that this description is provided to illustrate potential benefits of claimed subject matter and is not to be taken in a limiting sense.

Figure 3:
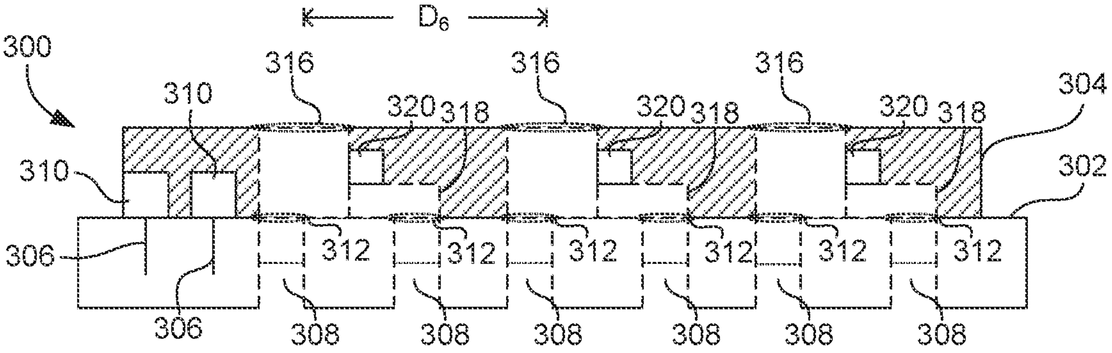
FIG. 3 is an example device comprising a molded structure with channels and a fluidic die with recirculation channels.

FIG. 3 illustrates an example fluid device 300 comprising a molded structure 302 and a fluidic die 304 (referred to more generally elsewhere herein as a dependent device). As illustrated, molded structure 302 includes a number of channels 308, similar to as described, above. It is noted that channels 308 are segmented into an upper and lower portion by a dotted line. This is done to show an upper portion in fluid communication with apertures 312 of fluidic die 304 along with lower portions which might span a length (as illustrated in FIG. 2) from one aperture to another (e.g., in a z-direction into and out of the page in FIG. 3). Fluids may enter the lower portions of channels 308 (e.g., from a fluid source) and flow into the upper portions towards apertures 312, as shall be discussed hereinafter.

Molded structure 302 also includes molded thermo-electric traces 306. It may be possible, using the approach described herein, to mold both thermo-electric traces and form channels (e.g., fluid channels) in a unitary structure, molded structure 302. This may be of interest, such as to reduce a dependence on external thermo-electric connections (e.g., traces or wires) outside of fluidic die 304 and molded structure 302.

Fluidic die 304 includes a number of elements that are similar to those already discussed in relation to FIG. 1. For instance, fluidic die 304 includes thermo-electric contacts 310 and apertures 312. Thermo-electric contacts 310 may enable operation of fluidic die 304, such as transmitting current pulses to ejection devices (e.g., resistors, piezo elements, etc.) to cause ejection of printing fluid. Thermo-electric contacts 310 may also enable dissipation of thermal energy, such as via thermo-electric traces 306. And apertures 312 may provide fluid communication toward nozzles 316. For instance, printing fluid may enter through apertures 312 and flow into ejection chambers from which the printing fluid may be ejected. In some cases, fluidic die 304 may include recirculation channels 318 to transmit printing fluid away from the ejection chamber. In some implementations, printing fluid may be caused to circulate by pumps or other fluid flow-inducing components. For instance, recirculation components 320 illustrate example elements that may cause fluid to travel from an ejection chamber through recirculation channel 318 and towards an output fluid channel.

FIG. 3 also illustrates nozzles 316 of fluidic die 304, via which printing fluids may be ejected. $D_6$ is shown as a nozzle-to-nozzle spacing, also referred to as a nozzle-to-nozzle pitch. In some implementations, $D_6$ may be on the order of approximately ninety μm and five hundred μm, by way of example.

Figure 4:
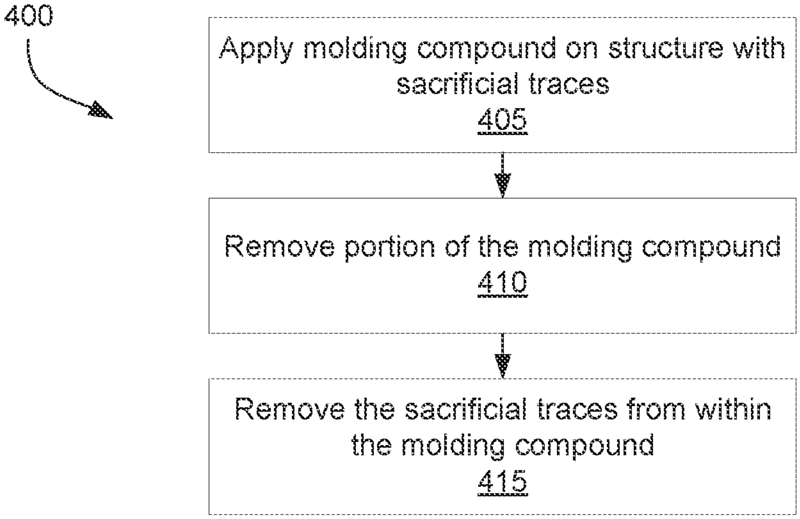
FIG. 4 is a flow chart illustrating an example method of forming a molded structure with channels.

FIG. 4 illustrates an example method 400 of forming a molded structure (e.g., molded structure 302 in FIG. 3). Reference will be made to FIGS. 5A-5D while describing method 400.

Figure 5A:
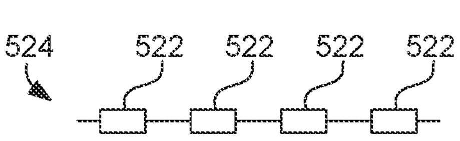
FIGS. 5A-5D show cross sections of an example molded structure illustrating various points in its fabrication.
Figure 5B:
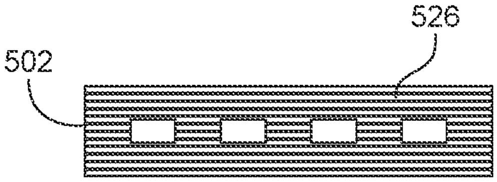

At 405, a molding compound is applied on or over a structure with sacrificial traces. FIG. 5A illustrates a structure 524 including example sacrificial traces 522. In one implementation, structure 524 may be a lead frame structure. In another, structure 524 may comprise a support layer upon which sacrificial traces are arranged (e.g., metal build up). Sacrificial traces may include Cu or Ni by way of non-limiting example. Sacrificial traces 522 may be within a range of approximately ten μm to approximately two hundred μm, or less. And FIG. 5B illustrates a molding compound 526 arranged on or over structure 524 from FIG. 5A, forming a molded structure 502. As noted above, molding compound 526 may be in a number of forms, for example, a low CTE material, such as EMC.

Figure 5C:
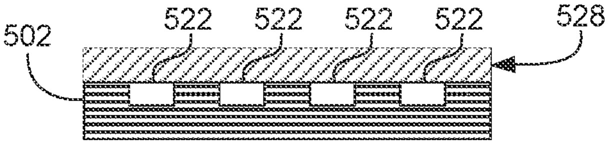

Returning to method 400, at 410, a portion of the molding compound is removed. FIG. 5C illustrates a removed portion 528 of molding compound 526 (from FIG. 5B). The removal of a portion of the molding compound may expose a portion of sacrificial traces 522. In one implementation, removal of the portion of molding compound may be done by surface grinding.

Figure 5D:
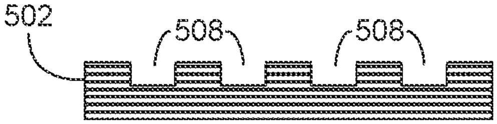

With sacrificial traces exposed, at 415 of method 400, the sacrificial traces may be removed from within the molding compound. For example, an etching process may be used, such as using a chemical etch to remove the sacrificial traces 522. FIG. 5D illustrates molded structure 502 after the removal of sacrificial traces 522 to yield channels 508.

Figure 6:
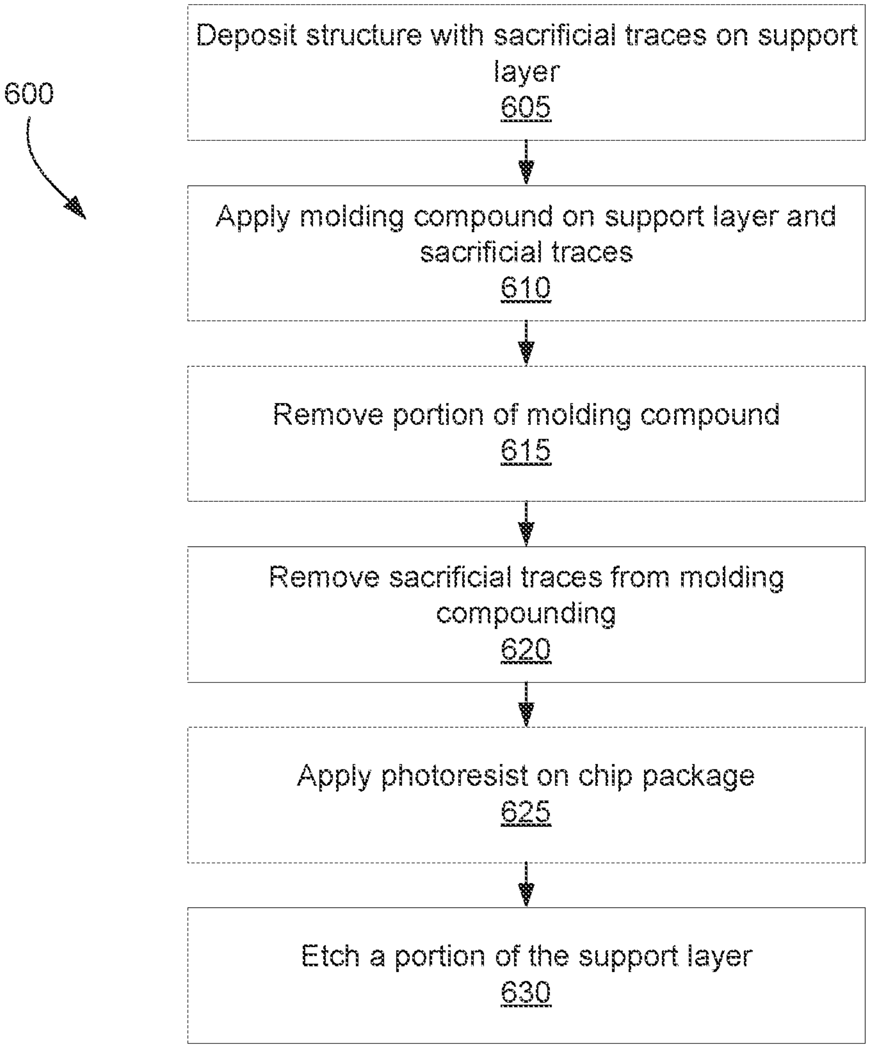
FIG. 6 is a flow chart illustrating an example method of forming a molded structure.

FIG. 6 illustrates an example method 600 for forming a molded structure (e.g., molded structure 302) with channels formed by removing sacrificial traces. In this example, sacrificial traces are built up on or over a support component (as opposed to using a lead frame, for example).

Figure 7A:
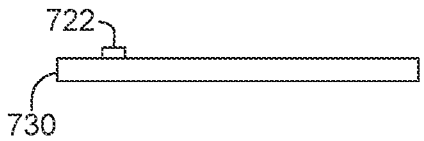
FIGS. 7A-7G show cross sections of an example molded structure at various points in its fabrication.

At 605, a structure comprising sacrificial traces (e.g., sacrificial traces 722 in FIG. 7A) is deposited on or over a support layer (e.g., support layer 730 in FIG. 7A). Examples of support layer 730 may include metals and metalloids (e.g., Cu-coated steel plate). Sacrificial traces 722 may be built up by dry film resist lamination over Cu-coated steel plate, laser direct writing to define sacrificial trace patterns, electroplating to deposit sacrificial metal, and then stripping the dry film resist. Of course, as noted, in other implementations, rather than building up sacrificial traces, as discussed in relation to 605, the structure comprising sacrificial traces (e.g., structure 524 in FIG. 5A) may comprise a lead frame structure upon which the molding compound may be applied.

Figure 7B:
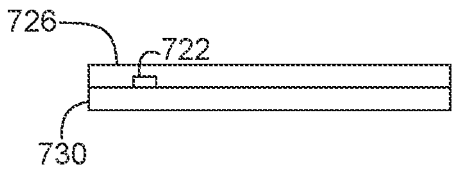

At 610, a molding compound (e.g., molding compound 726 in FIG. 7B) is applied on or over the support layer and the sacrificial traces from block 605. FIG. 7B illustrates molding compound 726 arranged on or over top of support layer 730 and sacrificial traces 722. Of course, other molding arrangements are contemplated by claimed subject matter. Molding compound 726 may comprise a low CTE material, such as an EMC, as described above.

Figure 7C:
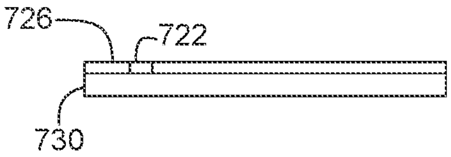

At 615, a portion of the molding compound is removed. FIG. 7C illustrates an upper portion of molding compound 726 removed such that a top of sacrificial traces 722 is exposed. As noted, above, removal of molding compound 726 may be performed by surface grinding.

Figure 7D:
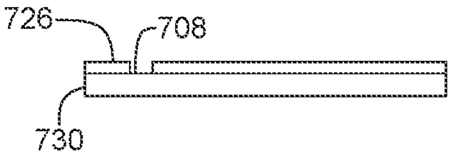

At 620, the sacrificial traces are removed from the molding compound. FIG. 7D illustrates channels 708 arranged within molding compound 726. The process of removing sacrificial traces 722 may include the use of a chemical etch selected to remove the sacrificial material but leave molding compound 726. Of course, as noted above, in some implementations both sacrificial traces 722 and thermo-electric traces may be embedded within molding compound 726. In such a case, the embedded thermo-electric traces may be protected from removal (e.g., a chemical etch) by application of a protective layer (e.g., photoresist). The remaining molding compound 726, channels 708, and support layer 730 may be referred to as a chip package (e.g., an EMC chip package).

Figure 7E:
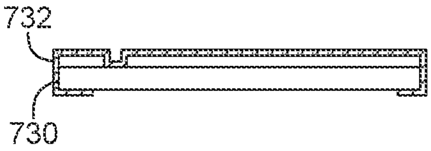

At 625, photoresist (e.g., photoresist layer 732 in FIG. 7E) is applied to the chip package. As shown in FIG. 7E, photoresist layer 732 may not completely cover the chip package. Indeed, a portion of support layer 730 may remain uncovered or exposed, so that a portion of support layer can be removed.

Figure 7F:
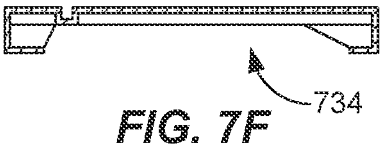
Figure 7G:
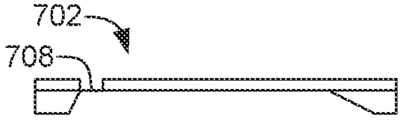

At 630, a portion of the support layer is etched. FIG. 7F illustrates a removed portion 734 of support layer 730. For example, in the context of a fluid ejection device, a fluidic die (e.g., fluidic die 304 of FIG. 3) may be attached to molded structure 702 within the space from which a portion 734 of support layer 730 was removed. The photoresist layer 732 may then be removed, leaving a finished molded structure 702, as illustrated in FIG. 7G.

As should be apparent from the above, the present description provides an approach for forming channels within a molded structure using sacrificial materials.

In the present description, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance (e.g., an intermediary substance formed during an intervening process operation), between the substance deposited and the substrate in this latter example; nonetheless, deposition "over" a substrate, while understood to potentially include deposition "on" a substrate (since being "on" may also accurately be described as being "over"), is understood to include a situation in which intermediaries, such as intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact but does not necessarily imply direct physical and tangible contact, such as if intermediaries, such as intermediary substances, are present. Thus, "on" is understood to mean "immediately over" and "beneath" is understood to mean "immediately under."

It is likewise appreciated that terms such as "over" and "under" are understood in a similar manner, as previously mentioned. These terms may be used to facilitate discussion but are not intended to necessarily restrict scope of claimed subject matter. For example, the term "over," as an example, is not meant to suggest that claim scope is limited to situations in which an implementation is right side up, such as in comparison with the implementation being upside down, for example. An example includes a molded structure (e.g., molded structure 202 in FIG. 2), as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present disclosure, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. Furthermore, the terms "first," "second" "third," and the like are used to distinguish different aspects, such as different components, as one example, rather than supplying a numerical limit or suggesting a particular order, unless expressly indicated otherwise. Likewise, the term "based on" and/or similar terms are understood as not necessarily intending to convey an exhaustive list of factors, but to allow for existence of additional factors not necessarily expressly described.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A device comprising:
a molded structure comprising:
thermo-electric traces; and
first channels;
a dependent device coupled to the molded structure, the dependent device comprising:
thermo-electric contacts connected to the thermo-electric traces; and
apertures,
wherein a cooling fluid travels through the first channels of the molded structure and into the apertures of the dependent device to extract thermal energy from the dependent device and carry the extracted thermal energy away from the dependent device through the apertures and the first channels, wherein the dependent device further comprises second channels, wherein the second channels are microfluidic channels through which the cooling fluid travels to carry the thermal energy away from the dependent device.

2. The device of claim 1, wherein the thermo-electric traces are configured to dissipate the thermal energy away from the dependent device.

3. The device of claim 2, wherein the thermo-electric traces are further configured to transmit electrical signals to the dependent device.

4. The device of claim 2, wherein the thermo-electric contacts are configured to enable dissipation of the thermal energy via the thermo-electric traces.

5. The device of claim 1, wherein the dependent device is a fluidic die of a fluid ejection device, the fluidic die comprising an array of fluid ejection nozzles through which droplets of printing fluid are ejected towards a substrate.

6. The device of claim 1, wherein the molded structure comprises one of an epoxy molding compound, a thermoplastic material, polyethylene, polyethylene terephthalate, polysulfone material, or a liquid-crystal polymer.

7. The device of claim 1, wherein the molded structure comprises a material having a coefficient of thermal expansion that is equal to or less than 20 ppm/C.

8. The device of claim 1, wherein the molded structure is a unitary structure such that the thermo-electric traces and the first channels are formed within the molded structure.

9. The device of claim 1, wherein the first channels are between ten μm and two hundred μm, or less, in one dimension and between one hundred μm and five hundred μm in a second dimension.

10. The device of claim 1, wherein the first channels comprise a plurality of channels arranged in a chevron-like arrangement within the molded structure, and wherein two adjacent channels of the plurality of channels are separated by a separation structure.

11. The device of claim 1, wherein the dependent device comprises second channels, and wherein the second channels are recirculation channels to transmit printing fluid away from an ejection chamber of the dependent device.

12. A device comprising:
a molded structure comprising:
thermo-electric traces; and
channels;
a fluidic die of a fluid ejection device, the fluidic die comprising;
an array of fluid ejection nozzles through which droplets of printing fluid are ejected towards a substrate coupled to the molded structure:
thermo-electric contacts connected to the thermo-electric traces; and
apertures;
wherein a cooling fluid travels through the channels of the molded structure and into the apertures of the dependent device to extract thermal energy from the dependent device and carry the extracted thermal energy away from the dependent device through the apertures and the channels, wherein the dependent device further comprises second channels, wherein the second channels are microfluidic channels through which the cooling fluid travels to carry the thermal energy away from the dependent device; and
wherein the thermo-electric contacts are configured to enable dissipation of the thermal energy via the thermo-electric traces.

13. The device of claim 12, wherein the molded structure comprises a material having a coefficient of thermal expansion that is equal to or less than 20 ppm/C.

14. The device of claim 12, wherein the fluidic die further comprises recirculation channels to enable recirculation of fluids in the fluidic die.

15. The device of claim 12, wherein the channels comprise a plurality of channels arranged in a chevron-like arrangement within the molded structure, and wherein two adjacent channels of the plurality of channels are separated by a separation structure.

16. The device of claim 12, wherein the molded structure is a unitary structure such that the thermo-electric traces and the channels are formed within the unitary structure.

* * * * *